Patented Feb. 5, 1924.

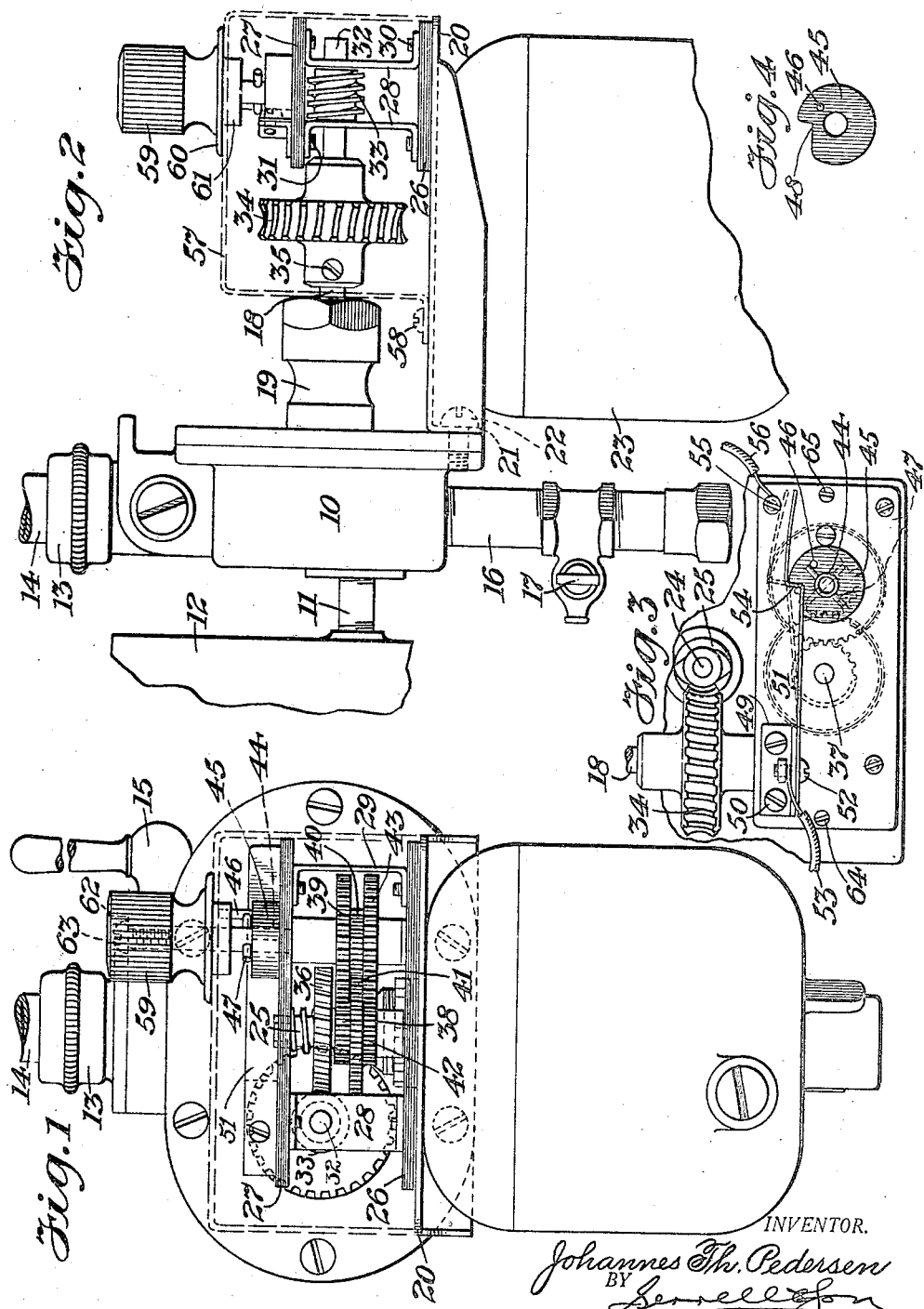

1,482,581

UNITED STATES PATENT OFFICE.

JOHANNES TH. PEDERSEN, OF FLUSHING, NEW YORK, ASSIGNOR TO AARON M. SLOSS, OF NEW YORK, N. Y.

AUTOMATIC POWER-SHUT-OFF MECHANISM.

Application filed January 20, 1921. Serial No. 438,808.

*To all whom it may concern:*

Be it known that I, JOHANNES TH. PEDERSEN, a citizen of the United States, residing at Flushing, borough of Queens, city and State of New York, have invented an Improvement in Automatic Power-Shut-Off Mechanism, of which the following is a specification.

This invention relates to an automatic power shut-off mechanism and more particularly to a mechanism by which an electric motor is automatically stopped by shutting off the power after the motor has been caused to run for a predetermined period. As illustrated, the invention is applied to a coffee urn for repouring the coffee to prevent spilling the same and to retain the aroma of the beverage as employed in conjunction with a suitable pump driven by the motor and as set forth in Letters Patent No. 1,249,818, of December 11, 1917, although it will be understood that the invention is in no wise limited to the specific use in connection with an electric motor or in conjunction with a pump for repouring coffee in coffee urns and like structures, as the invention may be utilized for numerous other purposes without departing from the nature and spirit of the invention.

The invention involved, however, is particularly applicable to use in conjunction with coffee urns for repouring the coffee at stated intervals, as hereinbefore stated, in which use, as described in the Letters Patent aforesaid, the pump is connected to the gauge glass commonly employed, and the coffee raised by the pump from the bottom of the urn and forced upwardly through the gauge glass to the top of the urn in repouring the coffee. In this particular use, as will be appreciated, it is desirable and sometimes necessary to repour the coffee at more or less stated intervals and in repouring the coffee to have the repouring operation continue for a predetermined period, and it is for this particular use that the invention is more especially designed.

In carrying out the invention, therefore, I employ in conjunction with a pump and a motor for driving the same, together with the necessary electrical connections to and from the motor for supplying power thereto, a switch mechanism and devices associated therewith when driven by the motor whereby the switch is normally opened and the power consequently shut off from the motor, but by which, in the use thereof, the switch may be closed and the motor thereby supplied with power and caused to run, operating the pump for a predetermined period when the switch is again opened automatially after the said predetermined period has expired to shut off the power from the motor and thereby stop the same in the operation of the pump as will be hereinafter more particularly described.

In the drawing:

Figure 1 is a front elevation of the apparatus illustrating my present invention showing the casing in dotted lines in order to illustrate the operative parts of the mechanism.

Fig. 2 is a side elevation of the same mechanism showing the casing in the same manner.

Fig. 3 is a plan of the device forming the operative parts of this invention, and Fig. 4 is a plan illustrating the devices for operating the contact member for opening and closing the electric switch.

Referring to the drawing and as illustrated therein, in the application of the invention to a pump and motor for attachment to coffee urns for repouring coffee, the pump is indicated at 10 and the suction side of the pump is connected by a pipe 11 to the lower portion of a coffee urn partially indicated at 12 so as to make communication between the lower part of the reservoir in the coffee urn and the suction of the pump. The discharge end of the pump is indicated at 13 and this is connected by a gauge glass 14 which is partially illustrated and which, as will be understood, is connected to the upper portion of the coffee urn so as to communicate with the top of the reservoir therein. In the discharge end of the pump I may employ a shut off cock 15 and in the suction end of the pump there may be employed a drain pipe in which there is fitted a drip cock 17. The pump is preferably the form of rotary piston pump as illustrated in Patent No. 1,249,818 as aforesaid, and as the pump forms no part of the present invention it is not illustrated nor will it be described in detail. One of the rotary pistons of the pump, however, is connected to a piston shaft 18 passing through a suitable bearing 19 connected to the pump casing so that the pump may be driven from the motor as hereinafter described.

Associated with the pump 10 I employ a base plate 20 having a bracket 21 along one edge thereof so as to be connected to the pump casing by screws 22 or otherwise which are passed through the bracket and turned down into the frame of the pump. Also suitably connected to and carried by the base plate 20 is an electric motor 23 designed to drive the pump. The motor shaft is indicated at 24 and passes through the base plate 20, and above the same or at the side opposite the motor carries a worm wheel 25.

Secured to the base plate 20 and suitably distant from the motor casing I employ a frame comprising, as illustrated, insulating blocks 26 and 27 spaced and connected to one another by brackets 28 and 29. As illustrated, the brackets 28 and 29 are connected to the block 26 by the screws 30 and at their opposite ends the brackets 28 and 29 are connected to the block 27 by similar screws 31. Journaled in the brackets 28 is a driven shaft 32. Between the brackets 28 this driven shaft 32 is fitted with a worm wheel 33 and between the brackets 28 and the pump there is secured to the driven shaft 32 a worm gear 34 meshing with the worm wheel 25 on the motor shaft. As illustrated the worm gear 34 may be provided with hubs, one of which is adapted to be connected to the piston shaft 18 by a suitable set screw 35 or otherwise, the piston shaft having a flattened portion for the better engagement therewith of the end of the set screw or otherwise as may be desired so that the piston shaft is turned by the driven shaft 32 as the same is driven by the motor to operate the pump.

Journaled in suitable bearings provided therefor in the blocks 26 and 27 is a shaft 37. On this shaft 37 there is a worm gear 36 which meshes with the worm wheel 33 on the driven shaft 32 so that the shaft 37 is also turned by the driven shaft 32. Also secured to the shaft 37 is a pinion 38. This pinion 38 meshes with a gear 39 mounted on a sleeve which also carries a pinion 40. The pinion 40 meshes with a gear 41 mounted on a sleeve surrounding the shaft 37 on which sleeve there is also connected a gear 42 meshing with a gear 43 which is secured to a switch shaft 44 journaled in bearings provided therefor in the blocks 26 and 27, it being understood that the sleeve carrying the gear 39 and the pinion 40 surrounds the switch shaft 44 and is adapted to turn freely thereon.

The switch shaft 44 extends through the block 27 and appreciably beyond the same, and immediately above or at the outer side of the block 27 there is a disk 45 fitted over and adapted to turn freely on the switch shaft 44. In this disk there is secured a pin 46 which extends outwardly from the outer face thereof preferably parallel to the switch shaft 44, and immediately above the disk 45 or adjacent the outer face thereof there is a pin 47 which, as illustrated, passes through a bore provided therefor in the switch shaft 44. It will be understood, however, that it is not necessary for the pin 47 to extend beyond the switch shaft 44 on opposite sides thereof, as in some instances the pin may be secured in the shaft so as to extend therefrom on one side only. As clearly illustrated in Fig. 4 the disk 45 is provided with an angular notch 48 in the periphery thereof.

It will be understood that the blocks 26 and 27 are preferably made of insulating material and in a suitable position on the block 27 there is a terminal 49 which may be secured thereto by screws 50 or otherwise. Connected to this terminal 49 is a spring contact member 51 which, as illustrated, is fixed to the terminal by a screw 52 to which is also connected one of the lead wires 53, it being understood, however, that the spring contact member and the lead wire may be otherwise connected to the terminal in any suitable manner. The spring contact member 51 is provided with an angular bend 54 in such a position as to fit and lie within the angular notch 48 in the periphery of the disk 45 when the latter is in the proper position to receive the same, and that the spring contact member extends beyond its angular portion sufficiently far to contact with the terminal 55 to which the other lead wire 56 is connected when the spring contact member 51 bears against the circular periphery of the disk 45 as illustrated in dotted lines in Fig. 3 in order to close an electric circuit between the terminals 49 and 55.

The operative parts of the invention comprising the motor connections, the reduction gearing and the switch mechanism operated from the motor through the reduction gearing are enclosed by a suitable casing indicated at 57. This, as shown in dotted lines, may be secured to the base plate 20 by screws 58 or otherwise. Associated with the parts hereinbefore described I employ a button 59. This is also preferably made of insulating material and is provided with a flange 60 and a boss 61, the flange 60 fitting against the outer surface of the casing 57, while the boss 61 is adapted to pass through an opening provided therefor in the casing 57 so that the button may turn therein. The button 59 has a longitudinal bore to receive the outer end of the switch shaft 44 recessed as indicated at 62 to receive the head of a screw 63 adapted to pass through a portion of the longitudinal bore in the button which is of reduced diameter and to be turned down into a tapped bore in the outer end of the switch shaft adapted to receive the same so as to secure the button in place. In the face of the boss 61 there is a hole provided to receive the outer end of the pin 46 into which this pin extends when the button is in position as is clearly illustrated in Figs. 1 and 2 of the drawing. Also as shown the frame comprising the blocks 26 and 27 are connected by the brackets 28 and 29 and the parts associated therewith, as hereinbefore described, may be secured to the base plate 20 by screws 64 and 65 or otherwise. It will now be apparent that the switch devices and parts for operating the same may, if necessary, be readily removed and replaced or removed and repaired and then replaced by first removing the button, then removing the casing by loosening the screws 58 to gain access to the operative parts and then by removing the setscrews 35 and the connecting screws 64 and 65 by which the parts may be entirely disconnected. It will also be understood that the reduction gear mechanism hereinbefore described is particularly designed for employment in the use of the invention for the particular purpose described and that this or any other suitable set of reduction gears or equivalent devices may be employed between the motor or driven shafts and the switch shaft to obtain the desired ratio between the speed of the motor or driven shaft and the speed of the switch shaft for determining upon the predetermined period for which the apparatus is designed to operate.

In the use of the apparatus the parts are normally in the positions shown in full lines in Fig. 3 in which the switch is open inasmuch as the spring contact member is spaced from the terminal 55. Now, as will be apparent, by turning the button 59 in a clockwise direction the disk 45 is also turned through the connection between the button and the disk through the pin 46, and as illustrated the button may be turned approximately half a revolution, but irrespective of the extent to which the button is turned the disk will be moved sufficiently far to swing the spring contact against the terminal 55 to close the circuit. When the circuit is closed the motor starts turning the drive shaft 32 and operating the pump as well as the switch shaft through the reduction gearing, and when the switch shaft has turned sufficiently far it will pick up the disk 45 by one end of the pin 47 coming into contact with the pin 46 and will carry the disk until the switch shaft has made a complete revolution from the position in which it initially stood, when, obviously, the spring contact will automatically return to its normal position in which its angular bend fits into the corresponding recess 48 in the periphery of the disk whereby obviously the power to the motor will be shut off through the breaking of the circuit and the motor will stop. It will be equally obvious that when the pin 47 extends through the switch shaft and beyond both sides thereof one arm of the pin acts as a means for driving the disk by contacting with the pin 46 and the other arm of the pin 47 acts as a stop to limit the extent to which the button may be manually turned whereas if the pin 47 extends from one side of the switch shaft only the button may be turned not only to operate the spring contact to close the circuit but may also be manually operated, if desired, to open the circuit by turning the disk sufficiently far before the predetermined period has expired.

I claim as my invention:

1. In an automatic power shut-off mechanism and in combination, a motor, a shaft driven thereby, a revoluble member mounted freely on said shaft, a switch for opening and closing a circuit to the motor and which switch is normally maintained in an open position by the said revoluble member, and means by which the said revoluble member may be turned a partial revolution to operate the switch to close the circuit to the motor.

2. In an automatic power shut-off mechanism and in combination, a motor, a shaft driven thereby, a revoluble member freely mounted on the said shaft, a switch for opening and closing a circuit to the motor and which switch is normally maintained in an open position by the said revoluble member, means carried by the revoluble member for imparting a partial revolution thereto to operate the switch to close the circuit to the motor, and means carried by the said shaft and adapted to cooperate with the means carried by the revoluble member for causing the revoluble member to complete a revolution and to then open the switch to open the circuit to the motor.

3. In an automatic power shut-off mechanism and in combination, a motor, a shaft driven thereby, a disk mounted to turn freely on the said shaft, a switch including a contact arm normally maintained by the said disk in a position in which the switch is open, means carried by the disk for imparting a partial revolution thereto to operate the said contact arm to close the switch and the circuit therethrough to the motor, and means carried by the said shaft for cooperating with the means carried by the disk for causing the disk to complete a revolution and to thereby permit the contact arm to return to its normal position in which the switch and the motor circuit are open.

4. In an automatic power shut-off mechanism and in combination, a motor, a shaft driven thereby, a disk mounted to turn freely on the said shaft, a switch including a contact arm normally maintained by the said disk in a position in which the switch is open, a pin carried by the said disk, a button mounted on the end of the said shaft and adapted to engage the pin on the disk to impart a partial revolution to the disk to thereby acuate the contact arm to close the switch and the circuit therethrough to the motor, and a pin carried by the said shaft and adapted to engage the pin in the disk to cause the disk to complete a revolution and then to permit the contact arm to return to its normal position to open the switch and the motor circuit through the same.

5. In an automatic power shut-off apparatus and in combination, a motor, a shaft driven thereby, a switch adapted to close and open a circuit to supply and shut off power from the motor, a disk mounted to turn freely on the said shaft and to cooperate with the said switch to close and open the same, a pin secured in the disk and adapted to be moved to partially turn the disk to cause the same to close the switch, and a pin carried by the shaft and adapted to engage the pin on the disk to continue a revoluble movement of the disk whereby after the motor has run a predetermined period the switch will be automatically opened to shut off the power from the motor.

6. In an automatic power shut-off apparatus and in combination, a motor, a power shaft driven thereby, a counter shaft, reduction gears between the driven shaft and the power shaft so that the latter is driven by the former, a switch for opening and closing a circuit to the motor, a disk mounted to turn freely on the counter shaft and adapted to cooperate with the switch to close and open the same, a pin fixed in the disk and adapted to be moved to partially turn the disk to close the switch, and a pin carried by the said counter shaft and adapted to engage the pin on the disk to continue the revolution of the disk until the motor has run a predetermined period when the cooperation between the disk and the switch automatically causes the switch to open.

7. In an automatic power shut-off apparatus and in combination, a motor, a power shaft driven thereby, a counter shaft, reduction gears between the driven shaft and the power shaft so that the latter is driven by the former, a switch for opening and closing a circuit to the motor, a disk mounted to turn freely on the counter shaft and adapted to cooperate with the switch to close and open the same, a pin fixed in the disk and adapted to be moved to partially turn the disk to close the switch, and a pin secured in the counter shaft and adapted to act as a stop to determine the manual movement of the disk and also to coact with the pin on the disk to continue the movement of the disk until the motor has run for a predetermined period when the cooperation between the disk and the switch automatically opens the switch to stop the motor.

Signed by me this 31st day of December, 1920.

JOHANNES TH. PEDERSEN.